June 28, 1938. A. W. FRENCH, JR 2,122,202
EXPRESSING PRESS
Filed Jan. 17, 1935

INVENTOR.
Alfred W. French Jr.
by Parker, Crocknow & Farmer
ATTORNEYS.

Patented June 28, 1938

2,122,202

UNITED STATES PATENT OFFICE 2,122,202

EXPRESSING PRESS

Alfred W. French, Jr., Piqua, Ohio, assignor to The French Oil Mill Machinery Company, Piqua, Ohio Application January 17, 1935, Serial No. 2,219

3 Claims. (Cl. 100—48)

This invention relates to improvements in continuous presses of that kind, used for expressing oil or liquid from materials, which comprise a drainage cage or barrel into which the material is fed and in which an axial rotating shaft having one or more screws or worms advances the material lengthwise through the cage and extrudes the solid material through an opening at the end of the barrel, thus creating pressure which squeezes from the material its oil or liquid, which escapes through the drainage openings of the cage.

Presses of this type are usually equipped with adjustable means by which the extrusion aperture or opening for the solid material at the discharge end of the cage can be restricted to a greater or less extent to thereby more or less oppose the extrusion of the solid material as may be necessary to secure the most efficient operation of the press and the desired yield of the oil or liquid.

Heretofore manually operated means have been employed for thus adjusting or varying the area of the extrusion aperture, but, because of the great resistance offered by the compressed solid material at the extrusion aperture, such means can only be operated to reduce the aperture by the expenditure of great exertion and by shutting down the press. It has also heretofore been arranged to adjust the aperture restricting device by power driven mechanism which operates without stopping the press or the expressing operation, but such power driven adjusting mechanisms have been of objectionably complicated and expensive construction.

The primary object of my invention is to provide practical means of simple and durable construction whereby the extrusion aperture can be readily adjusted or varied in size with but little exertion and without stopping the operation of the press.

Other objects of the invention are to utilize the motion of the press worm shaft for varying the size of the extrusion aperture; also to provide adjusting means for the extrusion aperture which are operatively connected with and driven by the power drive means of the press; and also to provide adjusting means for the purposes stated which have the other features of improvement and advantage hereinafter described and set forth in the claims.

Figure 1:
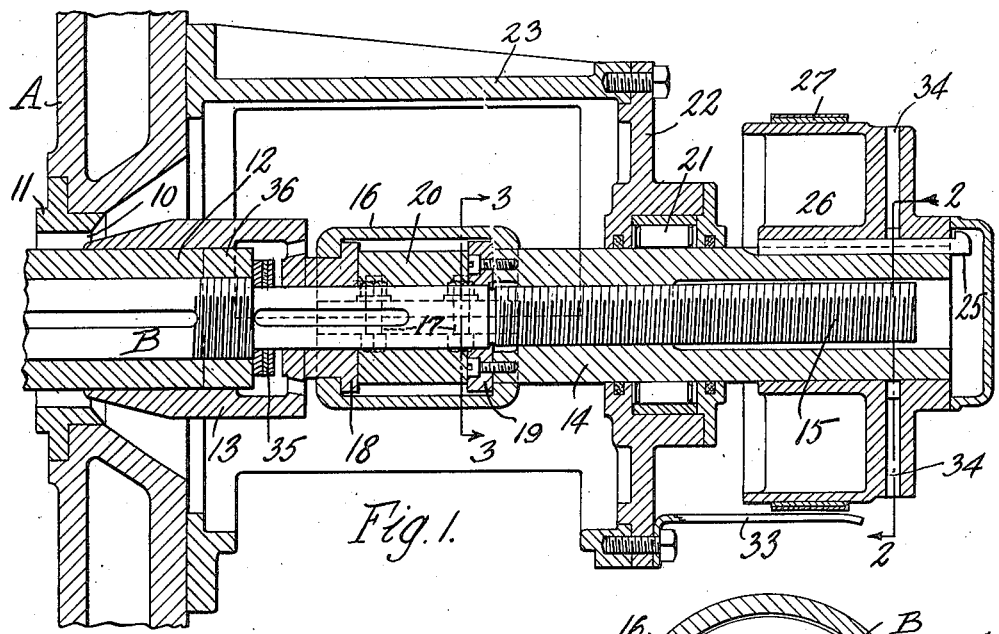
Fig. 1 is a longitudinal, sectional elevation of the discharge end portion of a press provided with means embodying the invention for varying the area of the extrusion opening of the press cage.
Figures 2, 3:
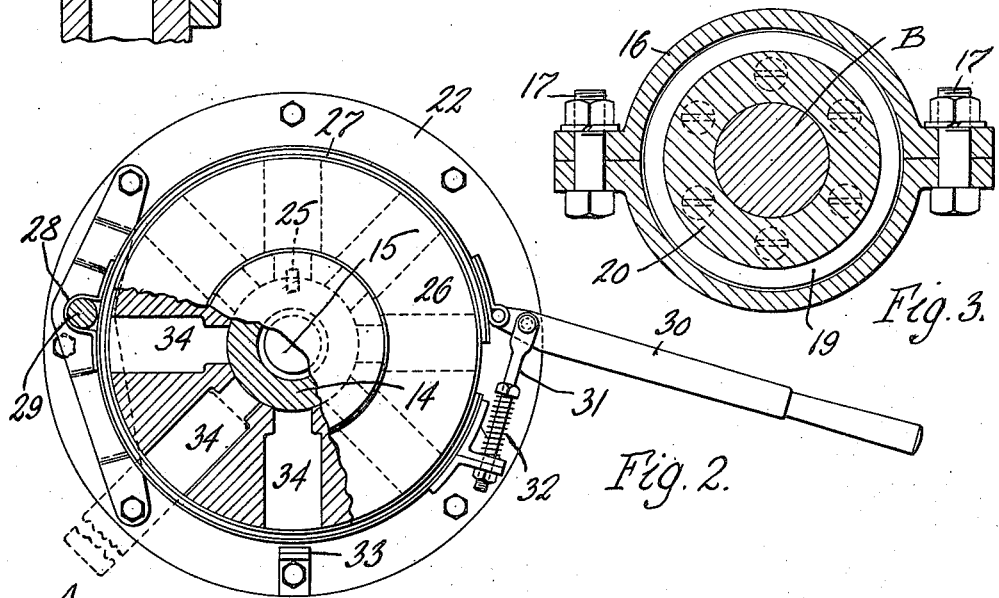
Fig. 2 is an end elevation thereof, partly in transverse section, on line 2—2, Fig. 1.
Fig. 3 is a transverse section thereof, enlarged, on line 3—3, Fig. 1.
Figure 4:
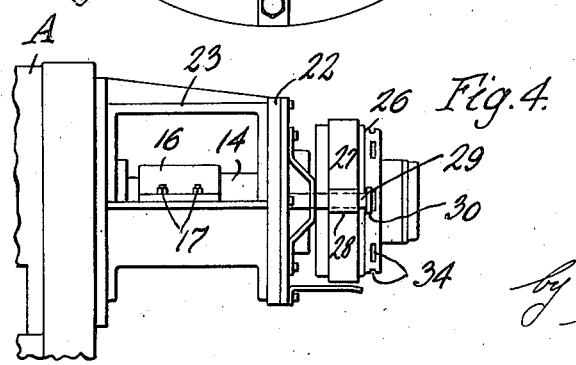
Fig. 4 is a side elevation thereof on a reduced scale.

A represents the discharge end portion of the drainage cage or barrel of the press and B the corresponding end portion of the power driven worm shaft which, as usual, extends axially through the press cage and has sleeved thereon one or more worms or screws by which the material fed into the cage is advanced through the cage and forced through the extrusion aperture 10 at the discharge end of the cage. This extrusion aperture, may be, as usual, a narrow annular space between the hardened bushing 11 in the end of the press cage, and the clamping sleeve 12 that secures the worms or screws (not shown) on the worm shaft. The pressure produced by the rotating worms on the material in the cage operates to extrude or force the solid material out through the extrusion aperture 10 and squeeze from the material its oil or liquid, which escapes through the drainage slits or openings in the circumferential walls of the cage. The pressure in the cage and consequently the percentage of oil or liquid expressed from a given material will vary with variations in the width or area of the extrusion aperture.

For effecting such adjustments or variations in the construction shown, an adjustable cone or tapered annular member 13 is provided which surrounds the sleeve 12 and is keyed on the worm shaft B to turn therewith. The small inner end of this cone is adapted to enter the extrusion opening 10 and more or less restrict the same by adjusting the cone 13 to a greater or less extent into the aperture. The cone is adjusted for this purpose by an adjusting sleeve 14 which surrounds and has a screw engagement with the threaded outer end portion 15 of the worm shaft B and is suitably coupled to the cone. By turning the sleeve relatively to the shaft in one direction or the other, the screw connection between the shaft and sleeve will move the sleeve inwardly or outwardly axially of the worm shaft.

As shown, the cone is coupled to the adjusting sleeve 14 by a split coupling sleeve 16 which has inwardly flanged ends and comprises two semi-cylindrical halves secured together, as by bolts 17. One flanged end of the coupling sleeve surrounds a reduced neck portion of the cone between the body of the cone and an annular flange 18 at the outer end of the neck, and the opposite flanged end of the coupling sleeve surrounds the adjusting sleeve 14 at the outer side of a circular disk 19 within the coupling and rigidly secured, as by bolts, to the inner end of the adjusting sleeve. Surrounding the worm shaft B within the coupling sleeve is a thrust sleeve or block 20 which abuts at one end against the outer end of the cone, and at the opposite end against the disk 19. The coupling sleeve is rotatable relatively to and forms a swivel joint between the cone and the adjusting sleeve 14, but if the adjusting sleeve is turned in one direction relatively to the worm shaft, it will be moved inwardly by its screw connection with the shaft, and by the thrust transmitted through block 20, will move the cone inwardly, whereas the opposite rotation of the adjusting sleeve relatively to the worm shaft will act through the instrumentality of the coupling sleeve 16 to pull the cone outwardly.

The adjusting sleeve is freely rotatable with the worm shaft in a roller or anti-friction bearing 21 of any suitable construction which thus acts as a guide bearing for the outer end of the rotary worm shaft. As shown, the roller bearing 21 is mounted in the outer end piece 22 of a stationary supporting bracket or part 23 fixed to the outer end of the press cage, but the bearing may be mounted on any suitable part of the stationary press frame.

The adjusting sleeve is turned relatively to the worm shaft for screwing it in or out on the shaft to adjust the cone 13, preferably as follows: Rigidly fixed on the outer end of the adjusting sleeve by a key 25 or otherwise, is a brake drum 26 adapted to be engaged by a suitable brake band or element 27 to oppose rotation of the brake drum and adjusting sleeve. As shown, this element 27 is a split contractible brake band surrounding the drum and provided between its ends at one side of the drum with a guide loop 28 which is slidable axially of the drum on a stationary guide rod 29 which may be fixed to the stationary support for the roller bearing 21 or other suitable part of the machine frame. A hand lever 30 is pivoted at its inner end to one end of the brake band and a link 31 pivoted to the lever is slidably connected to the opposite end of the brake band so that by swinging the lever in one direction, the brake band will be contracted to grip the drum. A spring 32 surrounding the link 31 between a collar on the link and a lug on the brake band to which the link is slidably connected, normally acts to spread the free ends of the brake band to expand the band and prevent it from gripping the brake drum. 33 is a bar fixed to the bearing support 22 or other stationary part of the machine and projecting beneath the lower half of the brake band to retain the brake band in proper operative relation to the brake drum.

In the operation of the press, the worm shaft rotates and the cone 13 and adjusting sleeve 14 normally rotate with the screw shaft, the brake drum rotating with the adjusting sleeve 14 within the normally expanded brake band. If it is desired to adjust the cone inwardly to restrict the extrusion aperture 10, the brake lever 30 is operated to contract the brake band so as to grip and oppose rotation of the drum. The worm shaft will then rotate differentially or relatively to the adjusting sleeve in a direction to screw the adjusting sleeve inwardly on the shaft, this action being continued sufficiently to cause the desired adjustment of the cone. That is, if the worm shaft B of the press rotates in a clockwise direction when viewed from the discharge end of the machine, and the screw thread 15 of the shaft is a left hand thread, then by preventing or retarding rotation of the adjusting sleeve relatively to the rotation of the worm shaft by applying the brake, the adjusting sleeve will screw inwardly and adjust the cone 13 inwardly or further into the extrusion aperture 10, thus restricting the aperture to an extent depending upon the extent of inward movement of the adjusting sleeve. When the adjusting sleeve thus moves axially of the shaft, the brake drum will move correspondingly and will tend to drag the brake band with it. The sliding mounting of the brake band on the gluide rod 29 enables the brake band to move axially with the drum and thus prevents the twisting of the band. The rotation of the worm shaft is thus utilized, simply by applying the brake, to adjust the cone 13 inwardly to restrict, as desired, the extrusion aperture, and only moderate exertion is required to apply the brake to thus adjust the cone, notwithstanding the fact that the inward movement of the cone is opposed by the packed solid material in the extrusion aperture and relatively great power is required to overcome this resistance. This power is furnished by the power-driven worm shaft. When it is desired to adjust the cone outwardly to enlarge or increase the area of the extrusion aperture, the rotation of the worm shaft is stopped and the adjusting sleeve is turned on the shaft in the direction to screw it outwardly along the shaft so as to pull the cone outwardly relatively to extrusion aperture. For this purpose, in the construction shown, the brake drum 26 is provided with a plurality of radial sockets 34 into any one of which a bar or lever can be inserted for turning the brake drum and adjusting sleeve manually.

If desired, the inward adjustment of the cone can be limited and the cone prevented from being wedged in the extrusion aperture by washers or shim plates 35 surrounding the worm shaft within the cone, between its outer end wall and the securing nut 36 for the worm clamping sleeves 12.

I claim as my invention:

1. The combination with a press cage having an extrusion aperture, and a driven rotary worm shaft, of an adjusting member which normally rotates with the shaft and has an operating connection with said shaft whereby differential rotation of the shaft and said adjusting member causes movement of the adjusting member relatively to the shaft, means for causing such differential rotation of the shaft and adjusting member comprising cooperating friction brake members, one fixed on said adjusting member, means for operating the other brake member at will during rotation of said driven shaft to frictionally engage the first member, means for mounting said second brake member to react against a stationary part of the press, and means actuated by said relative movement of the said adjusting member to vary the area of said extrusion aperture.

2. The combination with a press cage having an extrusion aperture, and a driven rotary worm shaft, of an adjusting sleeve which has a screw connection with said shaft and normally rotates with the shaft, a circular brake drum fixed to said sleeve, a brake member attached to a stationary part of the press, and manual means for operating said brake member for frictionally engaging said brake drum during rotation of said driven shaft to oppose rotation of the sleeve with the shaft and thereby move the sleeve axially in one direction relatively to the shaft, and a device actuated by the axial movement of said sleeve for restricting said extrusion aperture.

3. The combination with a press cage having an extrusion aperture, and a driven rotary worm shaft, of an adjusting sleeve which has a screw connection with said shaft and normally rotates with the shaft, a brake drum fixed to said sleeve, a brake band for frictionally engaging said brake drum to oppose rotation of the sleeve with the shaft and thereby move the sleeve axially in one direction relatively to the shaft, means for mounting said brake band for reaction against a stationary part of the press and for axial movement with said sleeve, and a device actuated by said axial movement of said sleeve for restricting said extrusion aperture.

ALFRED W. FRENCH, Jr.